Jan. 15, 1957 J. L. HEATH 2,777,379
CULTIVATOR ATTACHMENT
Filed Oct. 29, 1953
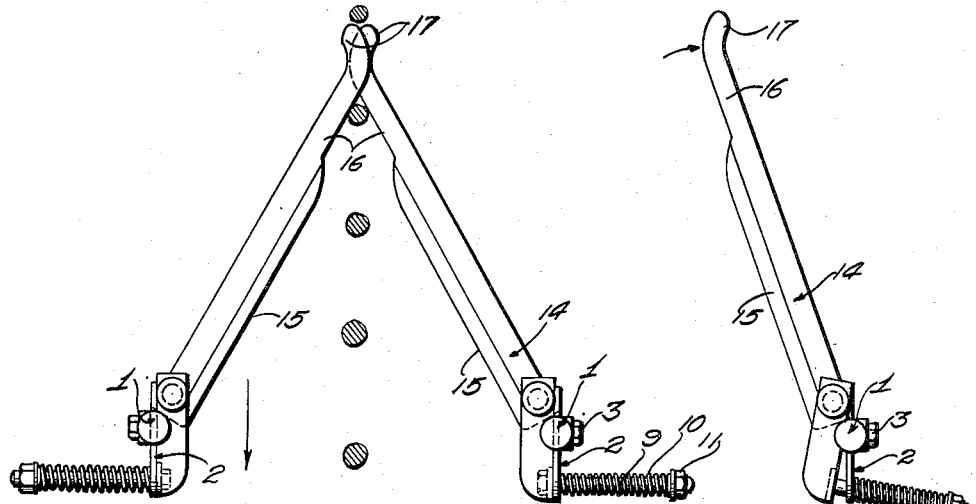
Fig. 1
Fig. 2
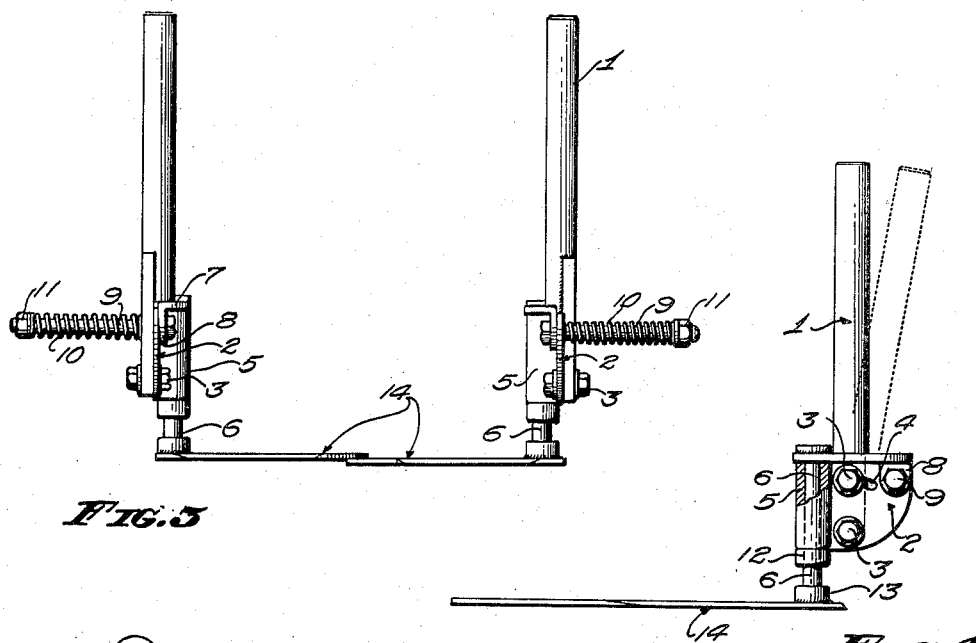
Fig. 3
Fig. 4
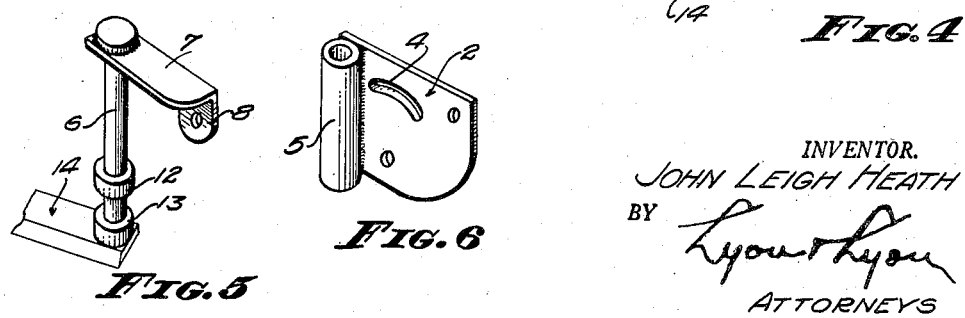
Fig. 5
Fig. 6
INVENTOR.
JOHN LEIGH HEATH
BY Lyon & Lyon
ATTORNEYS

2,777,379
CULTIVATOR ATTACHMENT
John Leigh Heath, Phoenix, Ariz.

Application October 29, 1953, Serial No. 389,009

9 Claims. (Cl. 97—179)

My invention relates to cultivator attachment for row crops, and included in the objects of my invention are:

First, to provide a cultivator attachment for row crops which may be mounted on most cultivators in place of the conventional cultivator blades, and which may be readily and quickly installed or renewed.

Second, to provide a cultivator attachment wherein pairs of yieldable weed cutting sweeps are so mounted as to pass along opposite sides of a row of crops (particularly, crops having a firm fibrous stalk at ground level, such as cotton, corn, sorghum, beans, and tomatoes), and destroy seedling weeds and grasses on opposite sides of the stalks of the crop.

Third, to provide a cultivator attachment wherein the cutting sweeps may be arranged with overlapping trailing edges arranged to separate and pass around each stalk of the crop, but operate effectively to destroy seedling weeds and grasses between the stalks.

With the above and other objects in view, as may appear hereinafter, reference is directed to the accompanying drawings in which:

Figure 1 is a top or plan view of my cultivator attachment showing a pair of the attachments in operative position, and indicating in section a row of plant stalks.

Figure 2 is a top view of one of the cultivator attachments showing the attachment in its lateral pivot position;

Figure 3 is a front elevational view of a pair of cultivator attachments, shown in operating position;

Figure 4 is a side view of one of the cultivator attachments;

Figure 5 is a fragmentary perspective view of the sweeper blade supporting assembly; and Figure 6 is a perspective view of the pivot plate.

My cultivator attachment for row crops is employed in pairs. Several pairs of attachments are supported from a conventional multiple row cultivator in place of the conventional cultivator blades.

Each cultivator attachment includes a vertical mounting post 1 adapted to be mounted and vertically adjusted on a conventional cultivator, not shown. The lower portion of the mounting post 1 is flattened and is attached to the side of a vertically disposed pivot plate 2 by bolts 3. The pivot plate may include a slot 4 so that the angular position of the pivot plate relative to the mounting post may be adjusted.

One end of the pivot plate 2 is provided with a vertically disposed tubular sleeve bearing 5. The bearing 5 receives a shaft 6. Welded to or otherwise secured to the upper end of the shaft 6 is an arm 7 which overlies the upper edge of the pivot plate 2 and terminates in a depending lug 8. A bolt 9 extends through the lug 8 and pivot plate 2 and receives a coil spring 10 and an adjustment nut 11 disposed so as to urge the lug 8 into yieldable contact with the pivot plate 2.

The shaft 6 is provided with a collar 12 below the sleeve bearing 5 and projects below the collar into a mounting boss 13 welded or otherwise secured to a sweeper blade 14. The lower end of the shaft 6 may be screw threaded into the mounting boss 13 and the latter welded in order that the angular relation of the sweeper blade 14 be fixed. The pair of sweeper blades 14 extend from a mating pair of cultivator attachments and converge rearwardly. The leading portions of the sweeper blades are sharpened, as indicated by 15. The trailing portions 16 are not sharpened but are rectangular in cross-section so that they may rub against the sides of plant stalks without appreciable damage thereto. The tips of the trailing portions 16 are curved outwardly from each other, as indicated by 17.

Operation of my cultivator attachment is as follows:

The pairs of attachments are adjusted relative to the cultivator so that each pair of cultivator attachments is centered relative to a row of crops. The angular position of the cutter blades with respect to the horizontal is adjusted so as to conform substantially to the slope of the ground, depending on whether the rows of crops are arranged along a mound of earth or in a slight trench. In most cases, each pair of sweeper or cutter blades is arranged with the curved tips 17 overlapping, as shown in Figs. 1 and 3.

As the cultivator is moved forwardly down the row of crops, each pair of cultivator attachments cuts the weed or grass seedlings growing on either side of the row of crops. The trailing end sections 16 are sufficiently dull so that, though they rub against the sides of the stalk, no appreciable harm is done. These end sections engage each stalk and are spread apart thereby. Between the stalks the end sections converge to destroy the weed and grass seedlings which may be growing in this region.

It should be observed that the weed and grass seedlings are much more tender or fragile than the stalks of the row crops so that the trailing end sections need not be sharp in order to destroy them. The sharpened leading portions of the sweeper or cutter blades 14 remove the accumulation of weeds which may be growing on either side of the row of crop plants.

It should be observed also that while it is preferred to dispose the trailing end sections 16 in overlapping relation and permit engagement with the stalks of the plants, they may be initially adjusted by adjusting the angular position of the mounting posts relative to the cultivator so that they are spaced from each other. This is done when the nature or age of the crop does not permit the engagement of the stalks.

The coil springs 10 and their adjustment nuts 11 enable the tension on the trailing end sections 16 to be adjusted so that the force required to separate these ends is within the strength of the plant stalks.

Having fully described my invention, it is to be understood that I do not wish to be limited to the details herein set forth but my invention is of the full scope of the appended claims.

I claim:

1. A cultivator attachment for row crops, comprising: a pair of mounting posts for attachment to a cultivator and adapted to be disposed at opposite sides of a row of crops; a pair of rigid flat sweeper blades sharpened along their confronting edges; means pivotally connecting said blades to said mounting posts stop means for limiting pivotal movement of said blades; yieldable means urging said blades to extend in a converging rearward direction from said posts, the extended portions of said blades being yieldably engageable with opposite sides of the stalks of a row crop and dull to minimize damage to said stalks.

2. A cultivator attachment for row crops, comprising: a pair of rearwardly converging, substantially horizontally disposed sweeper blades having dulled and curved trailing portions and sharpened leading portions, the trailing portions adapted to mutually engage each other; adjustable means yieldably urging the trailing portions of said blades toward mutual engagement, whereby upon movement of said blades along opposite sides of a row of crops said blades yield to permit passage of the stalks thereof and close to engage seedling weeds and grass between said stalks; and adjustable stop means for limiting converging movement of said blades.

3. A cultivator attachment for row crops, comprising: a pair of rearwardly converging, substantially horizontally disposed sweeper blades having dulled trailing portions and sharpened leading portions, the trailing portions adapted to mutually engage each other; adjustable means yieldably urging the trailing portions of said blades toward mutual engagement, whereby upon movement of said blades along opposite sides of a row of crops said blades yield to permit passage of the stalks thereof and close to engage seedling weeds and grass between said stalks adjustable stop means for limiting converging movement of said blades; and means for angularly adjusting said blades about a horizontal axis traversing said blades thereby to raise and lower the trailing ends of said blades to place said blades in approximate parallelism with the ground.

4. A cultivator attachment for row crops, comprising: a pair of rearwardly converging, substantially horizontally extending blades having sharpened leading portions and dulled trailing portions; means for pivoting said blades about their leading portions stop means for limiting relative converging movement of said blades; means yieldably urging the trailing portions of said blades toward mutual engagement; the trailing portions of said blades, when drawn past a row of crops, adapted to engage the stalks of the plants and separate to permit passage of the stalks of said crops and afterwards to close to engage seedling weeds and grasses growing between said stalks.

5. A cultivator attachment for row crops, comprising: a pair of rearwardly converging, substantially horizontally extending blades having sharpened leading portions and dulled trailing portions; means for pivoting said blades about their leading portions stop means for limiting relative converging movement of said blades; means yieldably urging the trailing portions of said blades toward mutual engagement; the trailing portions of said blades, when drawn past a row of crops, adapted to engage the stalks of the plants and separate to permit passage of the stalks of said crops and afterwards to close to engage seedling weeds and grasses growing between said stalks; and means for angularly adjusting said blades about a horizontal axis traversing said blades thereby to raise and lower the trailing ends of said blades to place said blades in approximate parallelism with the ground.

6. A cultivator attachment for row crops, comprising: a pair of rearwardly converging, substantially horizontally extending blades having sharpened leading portions and dulled trailing portions; a mounting bracket for each blade adjacent its leading end; a mounting post for each bracket, pivotally connected therewith to permit limited pivotal movement of said blades about substantially vertical axes; yieldable means interposed between said posts and brackets urging the trailing portions of said blades toward mutual engagement; the trailing portions of said blades, when drawn past a row of crops, adapted to engage the stalks of the plants and separate to permit passage of the stalks of said crops and afterwards to close to engage seedling weeds and grasses growing between said stalks.

7. A cultivator attachment for row crops, comprising: a pair of rearwardly converging, substantially horizontally extending blades having sharpened leading portions and dulled trailing portions; a mounting bracket for each blade adjacent its leading end; a mounting post for each bracket, pivotally connected therewith to permit limited pivotal movement of said blades about substantially vertical axes; yieldable means interposed between said posts and brackets urging the trailing portions of said blades toward mutual engagement; the trailing portions of said blades, when drawn past a row of crops, adapted to engage the stalks of the plants and separate to permit passage of the stalks of said crops and afterwards to close to engage seedling weeds and grasses growing between said stalks; and means for angularly adjusting said blades about a horizontal axis traversing said blades thereby to raise and lower the trailing ends of said blades to place said blades in approximate parallelism with the ground.

8. A cultivator attachment for row crops, comprising: a pair of upright mounting posts; a pair of pivot plates each having a bearing; means for attaching each pivot plate to a mounting post and effecting angular adjustment between the axis of said bearing and the axis of said mounting post; a shaft pivotally supported in each bearing; an arm attached to each shaft; means yieldably connecting each arm and pivot plate and tending to retain said shaft in a predetermined angular relation with said pivot plate; a pair of sweeper blades extending substantially horizontally from said shafts, said blades converging toward their extended ends, and urged toward mutual engagement at said extended ends by said yieldable means.

9. A cultivator attachment for row crops, comprising: a pair of upright mounting posts; a pair of bearing elements; means for angular adjustment of the axes of said bearing elements and the axes of said mounting posts; shafts journaled in said bearings; yieldable means permitting predetermined angular displacement of said shafts relative to said bearings; and a pair of blades connected at their leading ends to said shafts and converging rearwardly therefrom to their extended ends, said yieldable means controlling the converging relation of said blades, said angular adjustment means being arranged to effect tilting of said blades relative to said mounting posts so as to raise and lower their trailing ends.

References Cited in the file of this patent

UNITED STATES PATENTS

| | | |
|---|---|---|
| 115,213 | Johnson | May 23, 1871 |
| 545,945 | Corcoran | Sept. 10, 1895 |
| 672,375 | Joyce et al. | Apr. 16, 1901 |
| 1,050,993 | Orr et al. | Jan. 21, 1913 |
| 1,275,356 | Anderson | Aug. 13, 1918 |
| 1,654,765 | Troyer | Jan. 3, 1928 |
| 1,765,358 | Donald | June 17, 1930 |
| 2,307,533 | Neumann et al. | Jan. 5, 1943 |
| 2,386,559 | Laikam | Oct. 9, 1945 |